Jan. 29, 1935.    J. R. SMITH    1,989,561
GIN SAW FILING MACHINE
Filed July 13, 1933    8 Sheets-Sheet 5

Jan. 29, 1935.  J. R. SMITH  1,989,561
GIN SAW FILING MACHINE
Filed July 13, 1933  8 Sheets-Sheet 7

Jan. 29, 1935.  J. R. SMITH  1,989,561
GIN SAW FILING MACHINE
Filed July 13, 1933  8 Sheets-Sheet 8

Inventor:-
John R. Smith
by his Attorneys
Howson & Howson

Patented Jan. 29, 1935

1,989,561

UNITED STATES PATENT OFFICE 1,989,561

GIN SAW FILING MACHINE

John R. Smith, McDonough, Ga., assignor to Henry Disston & Sons, Incorporated, Tacony, Pa., a corporation of Pennsylvania Application July 13, 1933, Serial No. 680,319

18 Claims. (Cl. 76—32)

This invention relates to improvements in machines for sharpening gin saws, and the principal object of the invention is to provide a generally improved machine of this character.

A more specific object of the invention is to provide a machine of the stated character having automatic indexing means for adjusting the operation of the machine to varying pitches of saw teeth.

Another object of the invention is to provide novel means providing for accurate self-adjustment of the machine with respect to the saw.

Still another object of the invention is to provide novel and improved feed mechanism for adjusting the work with respect to the cutting tools, and for automatically controlling the working stroke of said feeding means in accordance with the pitch of the saw teeth or variations in said pitch.

Another object of the invention is to provide novel means engageable with the space block of the gang saw for self-adjustably supporting the machine.

A further object of the invention is to provide novel gage means controlling the position of the cutting tool with respect to saws of different diameters.

The invention further resides in certain novel structural details, mechanical devices and arrangements of parts hereinafter set forth and illustrated in the attached drawings, in which:

Figures 1, 13:
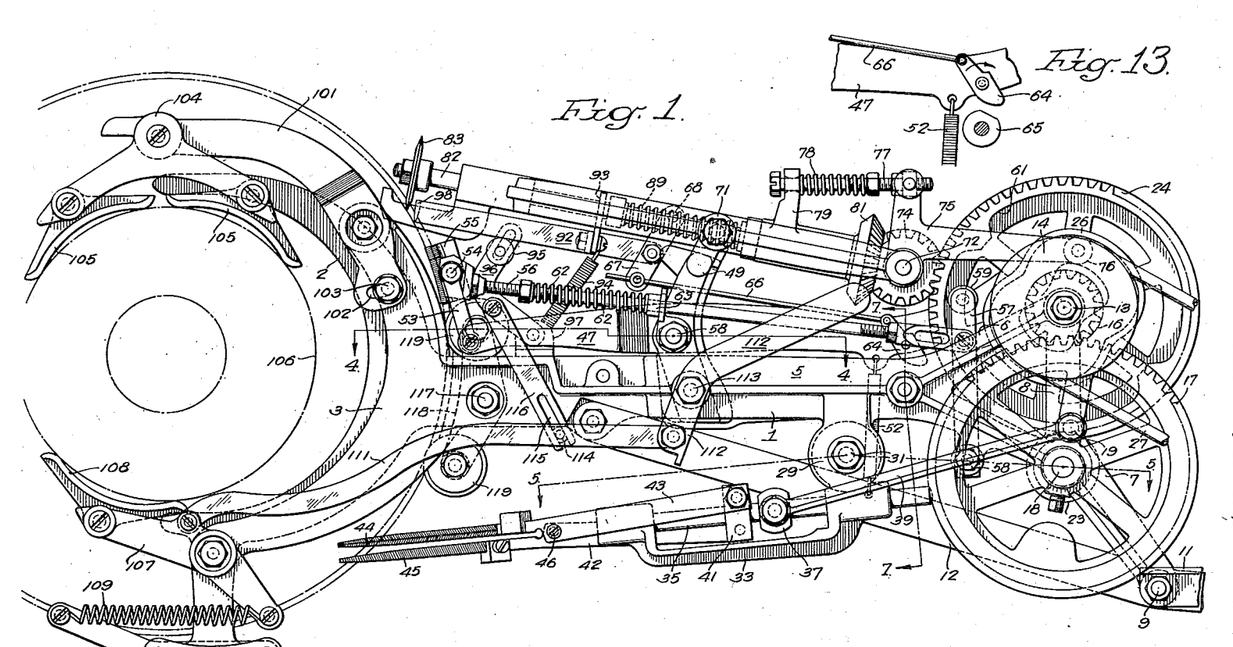
Figures 1 and 2 are side elevations of opposite sides of the machine respectively.
Fig. 13 is a fragmentary elevational view illustrating a detail of the feed control mechanism.
Figure 2:
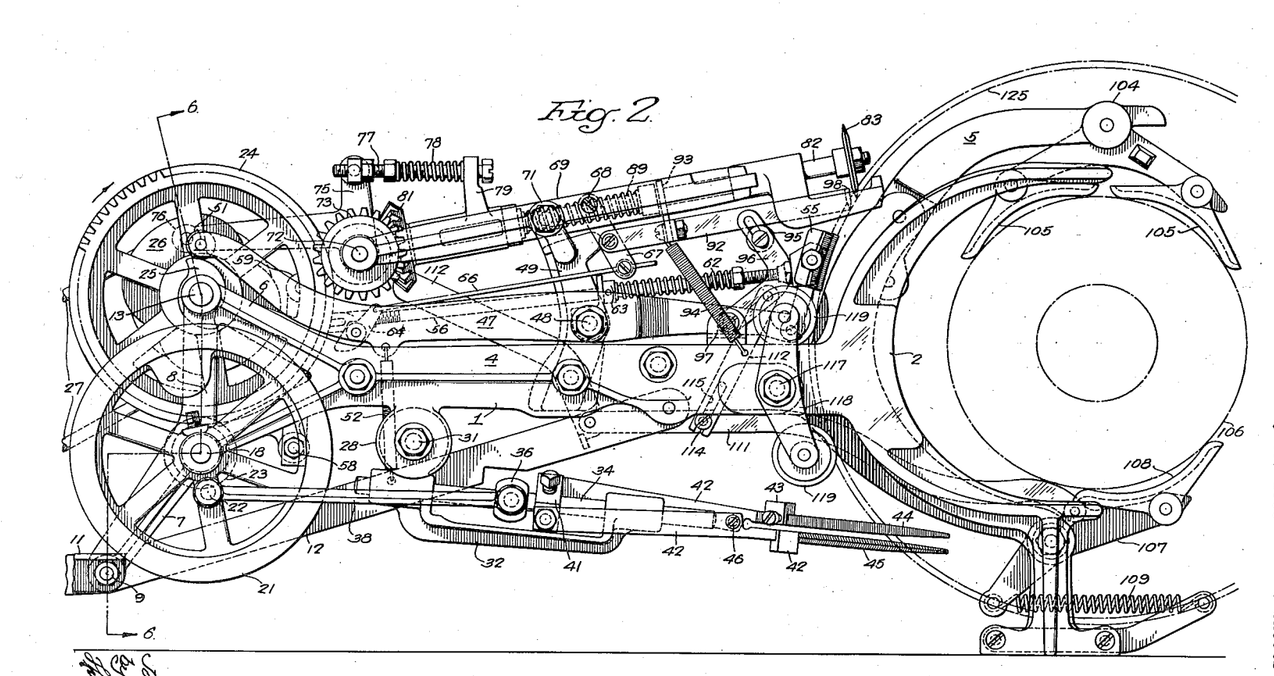
Figures 4, 10, 10A, 11, 12:
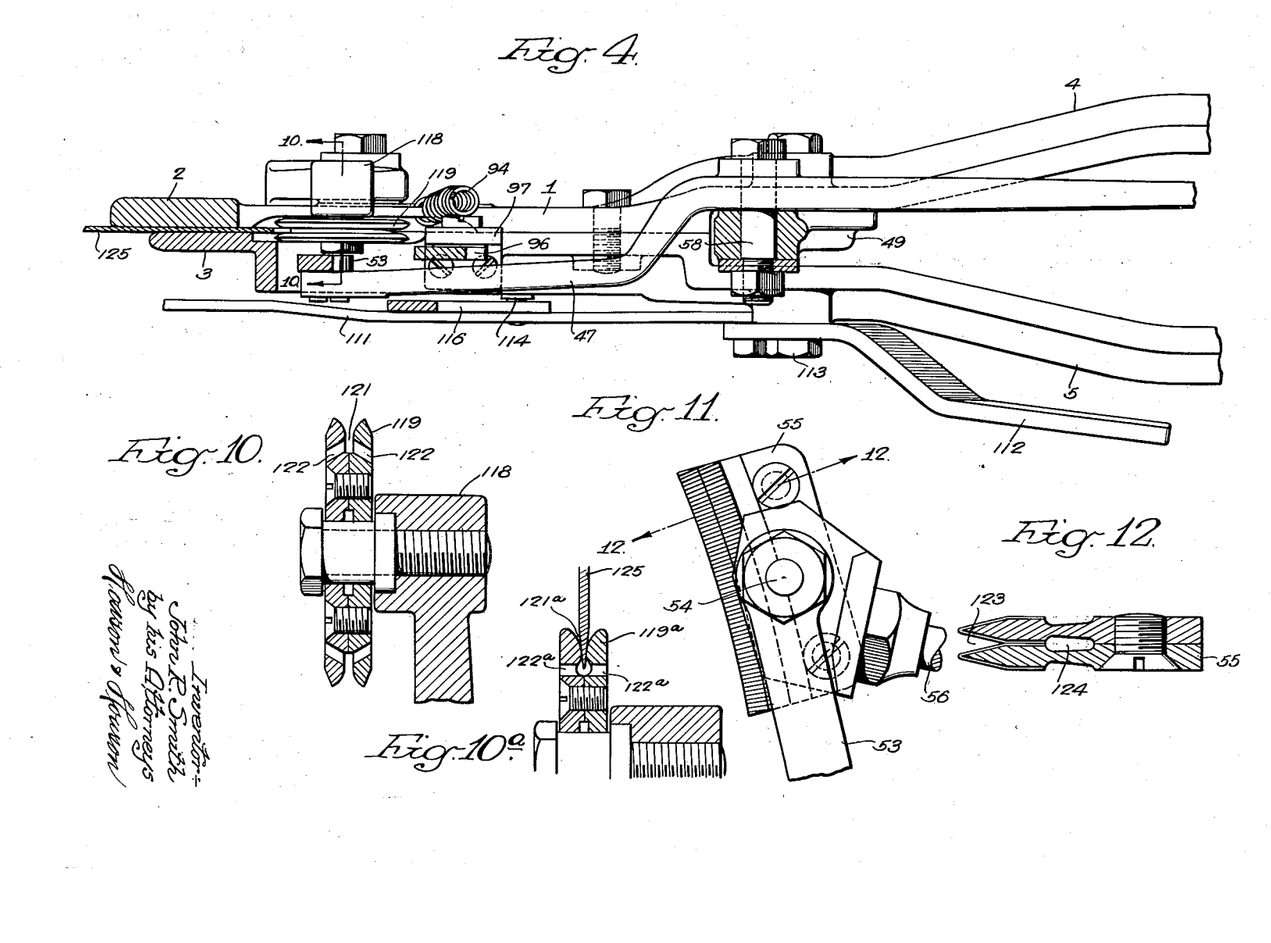
Fig. 4 is a section on the line 4—4, Fig. 1.
Fig. 10 is a section on the line 10—10, Fig. 4.
Fig. 10a is a fragmentary sectional view showing a modified form of gage roller.
Fig. 11 is a fragmentary elevational view showing details of the feeding dog.
Fig. 12 is a section on the line 12—12, Fig. 11.

With reference to Figs. 1 and 2 of the drawings, my machine in a preferred embodiment comprises a longitudinal frame 1, this frame terminating at its forward end in bifurcations 2 and 3, see Fig. 4, and at its rear end in bifurcations 4 and 5. As shown in Fig. 1, both of the bifurcations 2 and 3 are forked to form a recess for reception of the space block of a gang gin saw, and the forks of the bifurcation 3 constitute bearings for adjustable space block-engaging means hereinafter described.

Each of the bifurcations 4 and 5 at the rear end of the frame 1 is provided with divergent arms 6 and 7, the outer end of the arm 6 of each bifurcation being joined to the arm 7 by means of a connecting cross bar 8. The arm 7 of each bifurcation extends downwardly from the point of juncture with the cross bar 8 and are connected at their lower ends through the medium of a bolt 9 with a frame extension 11 constituting a support for an electric motor (not shown). The frame also comprises a diagonal strut 12 which extends from approximately the midsection thereof downwardly and longitudinally of the extension 11.

Journaled in the upper end of the arm 6 is a shaft 13, to one projecting end of which is secured a pulley 14 having an extended hub 15 formed with a pinion 16. This pinion meshes with a gear 17 carried by a shaft 18 journaled in the arms 7 at the point of juncture of said arms with the cross bar 8. The gear 17 has a crank 19 whose function will be described hereinafter. At its opposite end, the shaft 18 carries a wheel 21 having a crank 22 corresponding to the crank 19 but at the diametrically opposite side of the shaft 18. The function of the crank 22 will be described hereinafter. Keyed to the shaft 18 intermediate the bifurcations 4 and 5 is a pinion 23 which meshes with a gear 24 fixed to the shaft 13. This gear has formed at opposite sides thereof cams 25 and 26, the function of which will be hereinafter described. Power is applied to the shaft 13 through the pulley 14, which is connected by a suitable belt 27 with the electric motor (not shown) on the frame extension 11.

As shown in Figs. 1 and 2, each of the bifurcations 4 and 5 has a depending boss 28 and 29 respectively, and to these bosses are pivotally and adjustably attached by means of pivot bolts 31 forwardly extending arms 32 and 33 which constitute guides for reciprocatory rods 34 and 35. Each of these rods 34 and 35 has an outwardly projecting arm, 36 and 37 respectively, to which are connected the ends of connecting rods 38 and 39, which operatively connect the rods 34 and 35 with the cranks 22 and 19 of the wheels 21 and the gear 17 previously described. Rotation of the shaft 18 to which the said gear and wheel are connected, will thus result through the connecting rods 38 and 39 in a longitudinal reciprocation of the rods 34 and 35 in their respective guide arms 32 and 33. Each of the rods 34 and 35 carries a yoke 41 adjustably secured to the rod, and secured to opposite sides of each yoke and extending forwardly at opposite sides of the rods 34 and 35 and their respective supporting arms is a pair of resilient arms 42 and 43. Adjustably secured to the forward end of each of the arms 42 is a file 44, and a corresponding file 45 is adjustably attached to each of the arms 43. The forward ends of the arms to which the files are attached converge, and since the arm 42 in each instance is lower than the arm 43, the files 45 attached to the respective arms 42 extend diagonally under the respective companion files 44 secured as described to the arms 43. The relative arrangement of the files and their supporting arms is clearly illustrated in Figs. 1, 2 and 5.

Figures 5, 7, 9:
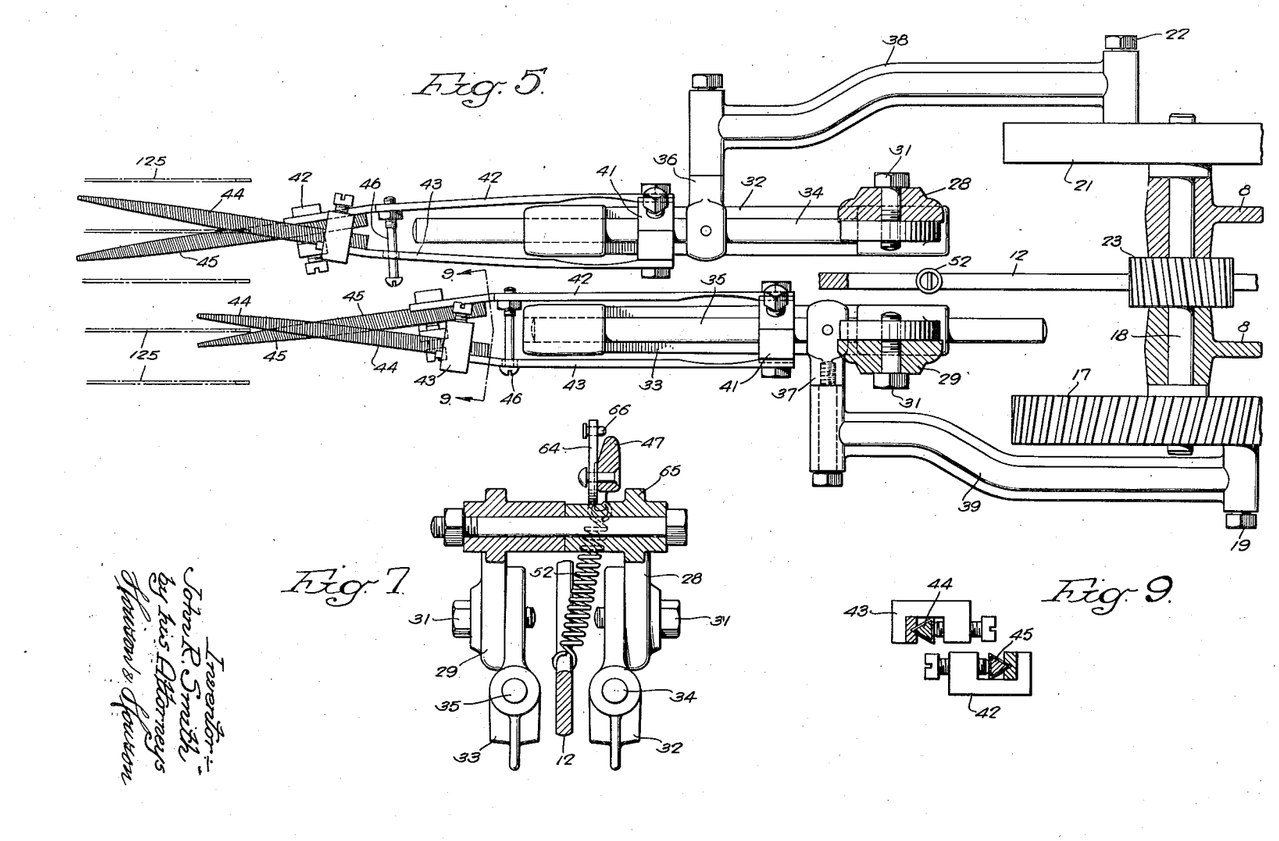
Fig. 5 is a section on the line 5—5, Fig. 1.
Fig. 7 is a section on the line 7—7, Fig. 1.
Fig. 9 is a section on the line 9—9, Fig. 5.
Figure 6:
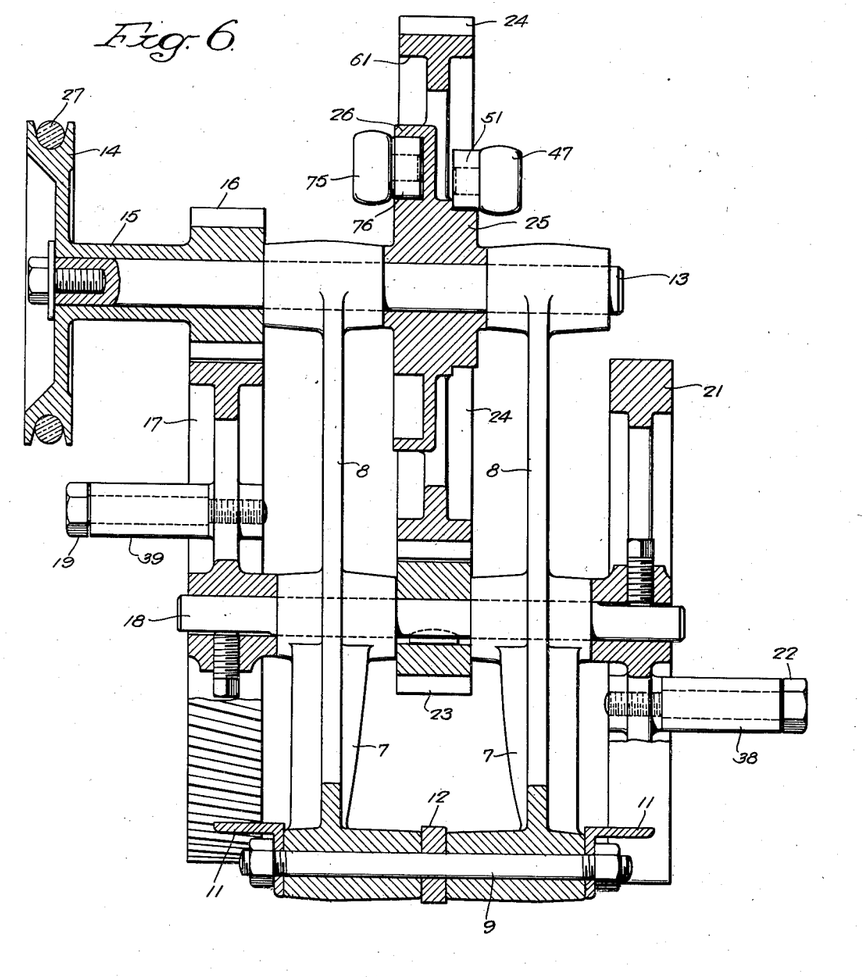
Fig. 6 is a section on the line 6—6, Fig. 2.

It will be noted by reference to Fig. 5 that screws 46 fastened in each of the arms 42 extend through apertures in the companion arms 43, the heads of these screws acting as stops preventing undue spreading of the sets of arms 42 and 43 and maintaining the files 44 and 45 in the diagonally crossed relation. These screws, however, do not prevent movement of the arms 42 and 43 towards each other, as illustrated.

The cam 25 of the gear wheel 24 is operatively associated with a lever 47, see Fig. 2, which is pivoted at 48 to an extension 49 of the frame 1. At its rear end, the lever 47 carries a roller 51 which contacts the cam 25, and a spring 52 resiliently holds the arm 47 and the roller 51 downwardly upon the cam. Attached to the forward end of the arm 47 is a link 53, see Fig. 1, which at its upper end is pivotally connected through the medium of a pin 54 to a feed dog 55, the function of which will be hereinafter set forth. Also pivotally attached to the dog 55 through the medium of the pin 54 is a rod 56 which extends longitudinally of the frame and whose rear end is pivotally connected to a lever 57, this lever being pivotally secured at 58 to the frame and having at its upper end a cam roller 59 arranged to contact a cam 61 formed on the inner side of the rim of the gear wheel 24. The rod 56, as shown in Fig. 1, is so formed as to be adjustable as to length, and this rod also carries a spring 62 which through the medium of a sleeve 63 secured to the frame exerts a forward pressure upon the rod 56 tending to move the dog 55 into an advanced position. The cam 61 acting upon the rod through the lever 57 acts to periodically withdraw and to subsequently release the rod 56 to permit the spring 62 to advance the dog as set forth. The lever 47 carries adjacent its rear end a pivoted cam 64 which is adapted to engage a boss 65 on an underlying portion of the frame to limit the downward movement of the rear end of the arm 47 under the action of the spring 52. The cam 64 is connected through a rod 66 with a lever 67 pivotally secured at 68 to a lever 69, the lever 69 being pivotally secured at 71 at the top of the frame extension 49.

Figure 3:
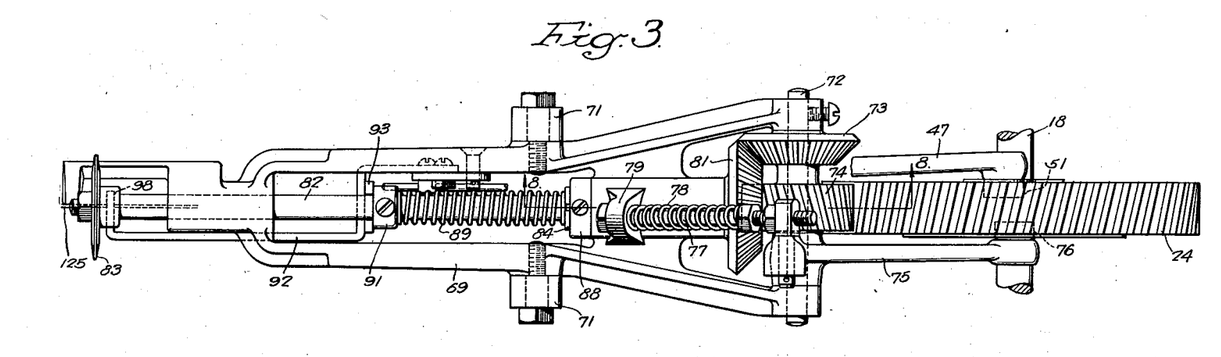
Fig. 3 is a fragmentary plan view of the machine.

The general form of this lever is illustrated in the fragmentary plan view of Fig. 3, wherein it will be noted that the lever at its rear end is bifurcated and carries between the bifurcations a pin 72 which constitutes a journal for a compound gear including a bevel pinion 73 and a pinion 74 which meshes with the gear 24 previously described. The pin 72 also constitutes a journal for a bell crank lever 75, the rearwardly extending arm of which carries a roller 76 which engages the cam 26 of the gear wheel 24. The upwardly extending arm of the bell crank lever 75, as shown in Fig. 2, is resiliently connected through a screw 77 and a spring 78 carried thereby with an upwardly projecting arm 79 of the lever 69. The spring 78 tends to maintain the bell crank lever 75 and the lever 69 in a predetermined relative position determined by the effective length of the screw 77 which is adjustable, whereby when the lever 75 is actuated by the cam 26, the lever 69 is correspondingly oscillated around its pivot 71. If, however, the forward end of the lever 69 is prevented from moving downwardly, the resilient connection between the levers permits a continued movement of the lever 75 independently of the lever 69. The bevel pinion 73 meshes with a bevel pinion 81 secured to the rear end of a shaft 82 which extends longitudinally of and is journaled in the lever 69, and on its forward projecting end the shaft 82 carries a rotary gummer file 83.

Figure 8:
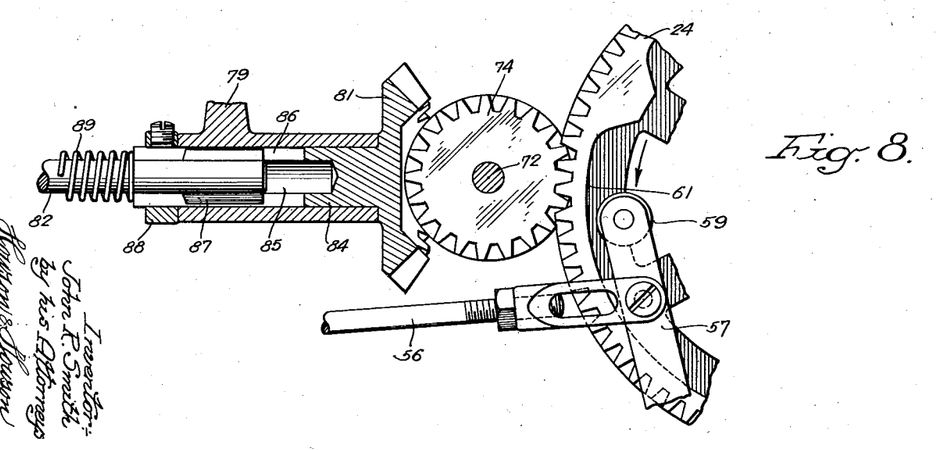
Fig. 8 is a section on the line 8—8, Fig. 3.

As shown in Fig. 8, the pinion 81 has an extended hub 84 which is journaled in a suitably formed portion of the lever 69. The hub 84 of the pinion is provided with a longitudinal cylindrical bore 85 for reception of the end of the shaft 82, and the forward end of the hub 84 is also provided with a longitudinal slot 86 for reception of splines 87 on the rear end of the shaft 82. This coupling provides a telescoping connection between the pinion 81 and the shaft 82 permitting limited axial movements of the shaft 82 independently of the pinion 81. The pinion is held in its journal by means of a collar 88 suitably secured to its projecting forward end.

The shaft 82 carries a spring 89 which is confined between the end of the hub 84 of the pinion 81 and a collar 91 fixed to the shaft. This spring resiliently urges the shaft 82 in a forward direction, the forward movement of the shaft being limited by an arm 92 which is pivotally secured to the lever 67 previously described, see Figs. 1 and 2. The lever 92 carries an upwardly extending bifurcated arm 93 which embraces the shaft 82 and constitutes an abutment for the collar 91. A spring 94 attached to the frame 1 and to the forward end of the arm 92 tends to hold the said arm in a depressed position or resting upon a pin 95 projecting from a lever 96, which lever is pivotally mounted at 97 on the frame and rests against a shoulder at the forward end of the rod 56, as shown in Fig. 2. The forward end of the lever 92 has a transversely projecting portion 98, see Fig. 3, which occupies a position adjacent the gummer file 83 and whose function will be hereinafter described.

The bifurcation 3 at the forward end of the frame 1 has pivotally attached to its upper fork an arm 101. The lower extension of this arm 101 is slotted, as shown at 102 in Fig. 1, and a screw 103 passes through this slot and into the said fork to thereby retain the arm 101 in any desired position of adjustment about its pivotal axis within the limits of the said slot. The forward end of the arm 101 carries a depending pivoted arm 104, to the opposite ends of which are pivotally secured a pair of shoes 105, which in practice are adapted to engage the space block of the gang gin saw, as illustrated in Fig. 1, wherein the space block is indicated by the broken line 106. Pivotally secured to the lower fork of the bifurcation 3 is a lever 107 which has pivotally secured to one end a shoe 108 which is adapted to engage the space block 106 at a point opposite the shoes 105. A spring 109 tends to resiliently advance the shoe 108 against the block, as illustrated, and means is provided for adjusting the lever 107 to retract the shoe 108 when desired to release the gang saw. This release means includes a rod 111 pivotally secured at one end to the lever 107, and being similarly connected at its opposite end to the lower end of a lever 112. The lever 112 is pivotally secured at 113 to the frame, and its upper free end constitutes a handle-grip whereby the lever may be adjusted on its pivot. The lower end of the lever 112 and the rod 111 constitute in effect a toggle so that when the upper end or handle portion of the lever 112 is depressed from the position in which it is shown in Fig. 1, the rod 111 is forced forwardly, thereby depressing the forward end of the lever 107 and retracting the shoe 108 from the space block.

The rod 111, see Fig. 2, carries a pin 114 which engages in a longitudinal slot 115 in a rod 116, the upper end of which is pivotally secured to the lever 96. When the rod 111 is adjusted as previously described to retract the shoe 108 from the space block, the pin 114 by engagement with the upper end of the slot 115 moves the rod 116 upwardly, thereby elevating the lever 96 around its pivot and effecting through the pin 95 an elevation of the forward end of the rod 92, which swings upwardly around its pivotal connection with the lever 67.

Pivotally secured at 117 to the frame 1 is an arm 118 which carries at both its upper and lower end a wheel 119. These wheels are formed as illustrated in Fig. 10 with a circumferential slot 121 adapted as hereinafter set forth for reception of the periphery of a gin saw. Extending inwardly from the outer faces of the wheels 119 to the lower ends of the slots are diagonal ports 122. These ports are adapted to clear the slots of possible accumulations of filings so as to maintain the slots clear for reception of the gin saws. A somewhat similar construction is employed in the feed dog 55, see Figs. 11 and 12. As therein illustrated, the dog comprises two sections placed face to face and formed at their forward edges with a V-shaped recess 123, the opposite sides of which are knurled or serrated as illustrated. These serrations extend rearwardly to an opening 124, from which the filings forced between the elements of the dog may fall clear. It will be noted that the dog is slightly curved at its working face to conform more or less closely to the peripheral curve of the gin saws which it is adapted to engage.

The operation of the machine is as follows: The lever 112 is actuated to move the shoe 108 to the retracted position, which permits adjustment of the machine into a position relative to the gin saw illustrated in Figs. 1 and 2. In adjusting the machine to the saws, one of the saws is passed between the bifurcations 2 and 3 and into engagement at its periphery with the gage rollers 119, 119, which as shown in Fig. 4 are in alignment with the space between the said bifurcations. In Fig. 4, the gin saw blade is designated by the reference numeral 125. The lever 112 is now returned to its original position, which results in clamping the space block of the gang saw between the shoes 105 and 108, as illustrated in Figs. 1 and 2. It will be apparent that by reason of the pivotal mounting of these shoes 105 and 108 and the levers by which they are carried, these machine-supporting elements adjust themselves automatically to the space block, and thereby in conjunction with the gage rollers 119 definitely position the machine with respect to the saw upon which it is to operate. In operation, the rear end of the machine is slightly elevated above the forward end and is so supported that the weight of the machine or a part thereof is brought against the blade contacting the gage rollers, and through the shoes 105 and 108 upon the space block.

Figures 14, 15, 16:
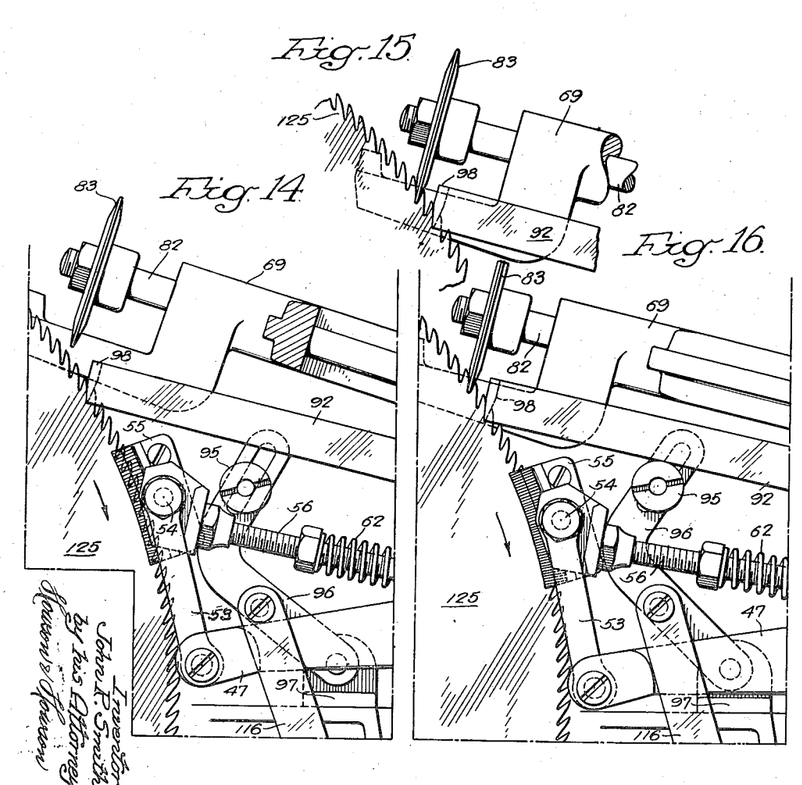
Figs. 14 to 18, inclusive, are fragmentary elevational views illustrating various steps in the cycle of operation of the machine.

As shown in Figs. 14 to 19, inclusive, the machine is so positioned relative to the saws that the gummer file 83 and the indexing pawl 98 are in position to enter the gullets between the teeth, see for example Fig. 15, while the dog 55 is in a position to engage the edge of the saw within the recess 123. Similarly, the sets of reciprocatory files 44 and 45, as shown in Fig. 5, are in positions to engage different saw blades of the gang, one at each side of the blade, which, as described above, has been inserted between the bifurcations at the forward end of the frame and which, therefore, is in a position to be acted upon by the gummer file 83, the index pawl 98 and the feeding dog 55. The files 44 and 45 engage the blades as shown, so that when retracted, the files clear the saws, and when advanced they are brought into engagement with the opposite sides of the teeth to file the latter in well known manner. The resiliency of the file-supporting arms 42 and 43 permits the relative adjustment of the files required by their forward movement in engagement with the saw blade.

Figure 17:
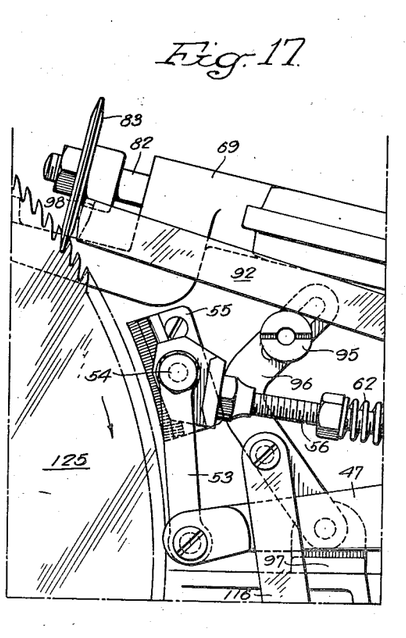
Figure 18:
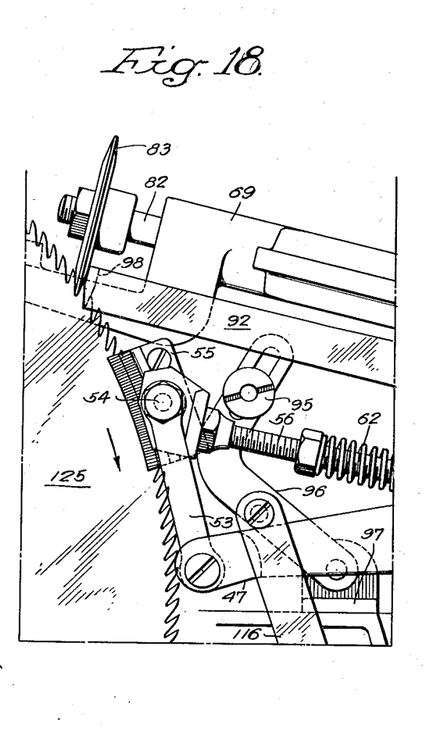

The motor may now be started with a resulting sequence of operations that may be readily followed by reference to Figs. 14 to 19, inclusive. As shown in Fig. 14, the gummer file is elevated from the saw while the indexing pawl occupies a position between two of the saw teeth. The feeding dog 55 in its elevated position is being forced by the spring 62 into engagement with the saw and is ready for the feeding operation. The lever 69 is now actuated through its associated cam mechanism to bring the gummer file 83 downwardly into the gullet between the teeth, as shown in Fig. 15, and simultaneously but at a slower rate the dog 55 moves downward to rotate the saw into a new position. During these movements of the feeding dog and of the gummer file 83, the index pawl 98 remains in engagement with the teeth, as shown in Figs. 14 and 15. When the feeding dog 55 has reached the bottom of its stroke, as shown in Fig. 16, the rod 56 is actuated by the associated cam to retract the dog from the saw, as shown in Fig. 17, and this retractive movement of the feeding dog through the lever 96 and pin 95 elevates the indexing pawl 98 from between the teeth and carries it to the position shown in Fig. 17, in which it is clear of the saw. Continued operation of the machine again elevates the dog through the medium of the spring 52 and advances it through the medium of the rod 56 and associated cam into engagement with the edge of the saw in the position shown in Fig. 14, wherein it is ready for a subsequent feeding operation. The movement of the dog 55 as it advances into engagement with the saw permits the lever 96 to drop to its original position, thereby also permitting the indexing pawl 98 to move downwardly into the gullet between the next succeeding pair of teeth, as shown in Fig. 18. It will be noted that as the indexing pawl is elevated from the saw, as previously described, it is permitted to return to its original advanced position, from which it had been forced rearwardly by a rotation of the saw under action of the feeding pawl so that it is in position to engage the next succeeding gullet of the saw. Similarly, the rotative movement of the saw by the feeding dog 55, since it occurs during the period that the gummer file is entered between the teeth, retracts the shaft 82 against the spring 89, so that when the gummer file is subsequently elevated and released from the saw teeth, this spring acts to advance it to its original position, wherein on the next downward movement it also engages the succeeding gullet to the one in which it was previously lodged.

Figure 19:
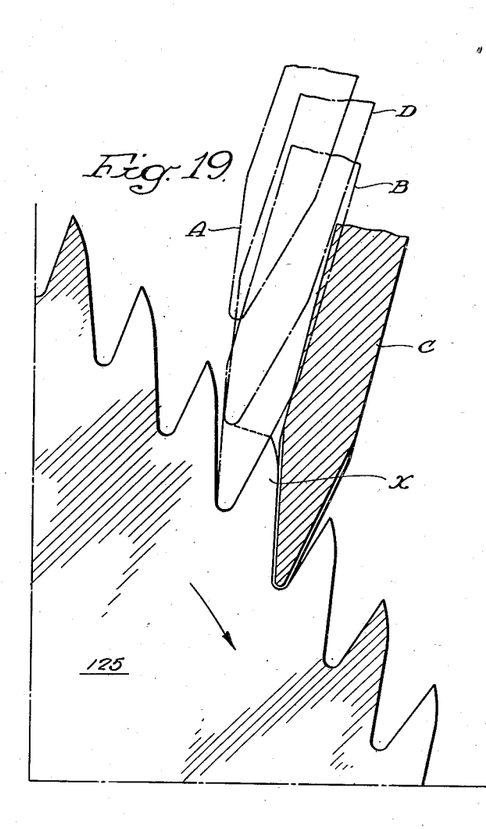
Fig. 19 is an enlarged diagrammatic view illustrating the action of the gummer file with respect to the saw.

The action of the gummer file upon the teeth is illustrated in Fig. 19, wherein the retracted or extreme elevated position of the file is indicated by the broken lines designated A. From this position, the file in entering the gullet between two of the teeth advances to the position indicated by the broken lines B, it being noted that in this position the file is contacting the leading edge of the tooth X and also the bottom of the gullet. At this point, the saw is turning slowly under actuation by the feeding dog in the direction indicated by the arrow to the position marked $X^2$, the gummer file moving with the saw to the full line position designated by the reference character C. In this movement, the relative position of the saw teeth and the gummer file has changed so that the file is now engaging the rear edge of the succeeding tooth. The gummer file is now retracted, bearing continuously against the same tooth until the periphery of the file clears the tip of the tooth, from which point it is shifted rapidly by the action of the spring 89 to the broken line position designated by the reference character D, and from this position, the file is completely withdrawn from the saw to its original position designated A, after which the cycle is repeated. It will be noted that in this operation both the leading and the rear edges of the teeth are operated upon by the gummer file as well as the bottom of the gullet, so that the proper contours as well as the depth of the teeth are maintained.

As previously described, the downward or working stroke of the feed pawl 55 is controlled by the adjustable cam 64, which is positioned for engagement with the fixed portion 65 of the frame. It will be apparent that if the upper end of the pivoted cam 64 is moved rearwardly from the position in which it is shown in the drawings, particular reference being had to Fig. 13, the downward movement of the lever 47 will be limited correspondingly. It is a function of the indexing pawl 98 to automatically regulate the stroke of the feed dog 55 in accordance with the pitch of the saw teeth upon which the machine is operating. Assuming for example that in any stroke of the dog 55 the resulting movement of the saw is in excess of the pitch of the teeth: since the movement of the saw is transmitted through the pawl 98, the rod 92, the lever 67 and the rod 66 to the pawl 64, it will be apparent that this excess movement of the saw will effect an adjustment of the cam 64 in the direction of the arrow, see Fig. 13, with the result that the succeeding downward movement of the rear portion of the lever 47 will be correspondingly restricted due to engagement of the cam 64 with the frame at 65. The length of the working stroke of the feed dog is controlled by the downward movement of the rear end of the lever, or in other words, the upward movement of the forward end of the lever and of the dog. The succeeding stroke of the feed dog, therefore, will be reduced. Similarly, the device operates to increase the stroke of the feed dog in the event that any stroke thereof is less than the tooth pitch; the cam 64 being adjusted in the opposite direction to increase the downward movement of the rear end of the lever 47, and consequently increasing the upward movement or travel of the feed dog. The device, therefore, acts automatically to regulate the stroke of the feed dog in accordance with the requirements of the particular blade being acted on at the moment, and no extra adjustment within reasonable limits is required for varying pitches. By reason of this automatic adjustment, the machine is relatively accurate in the filing operation and the results obtained are correspondingly good.

It will be noted that the gummer file is brought into engagement with the bottom of the gullets between the saw teeth with a substantially uniform pressure substantially regardless of the depth of the gullet, this by reason of the flexible and adjustable connection between the bell crank lever 75 and the lever 69 which carries the gummer file shaft. The pressure at which the saw is made to engage the bottom of the gullet may be readily and accurately regulated by adjustment of the spring 78. A material advantage is also afforded by use of a feeding dog so formed as to frictionally engage the saw blade so that the feeding operation is entirely independent of the teeth and is, therefore, unaffected by minor irregularities in the tooth formation or by spaces due to broken teeth. This feature, in conjunction with the automatic regulation of the feed previously described constitutes a major improvement in machines of this general character.

Attention is further directed to the method of supporting the machine in engagement with the gin saws including the self-adjustable space block-engaging shoes 105 and 108 and the self-adjusting gage rollers 119, which as previously described function to accurately center the machine with respect to the saw substantially independent of differences in diameter within the range met with in practice. It will be noted that adjustment of the arm 101 which carries the shoes 105 renders the machine adjustable for space blocks of differing diameter.

When the sharpening operation of one of the saw blades of the gang is completed, the machine is removed and reinserted to bring another blade into position for sharpening. As the machine progressively acts upon adjacent saw blades of the gang, the files 44 and 45 of the two groups as previously set forth operate respectively upon the blade which has previously been operated upon by the gummer file and the blade which is next in line for gumming. These files 44 and 45, therefore, in effect provide a roughing cut preceding the gumming operation and a finishing cut subsequent to the gumming operation.

It will be apparent that the machine is capable of modification without departing from the principle of the invention as defined in the appended claims.

I claim:

1. In a machine of the character set forth, the combination with a tool, of means for intermittently traversing the work to present predetermined spaced portions thereof to the tool, an element having intermittent interlocking engagement with the work at said spaced portions and movable with the latter in the traverse movement, and means actuated by movement of said element with the work for regulating the operation of the traversing means.

2. In a machine for sharpening toothed cutting blades, the combination with a cutting tool, of traversing mechanism operative intermittently to present the teeth successively to said tool, and means for automatically regulating the traversing mechanism, said means including a member operatively associated with said teeth and movable with the latter when the cutting blade is actuated by said traversing mechanism.

3. In a machine for sharpening toothed cutting blades, the combination with a cutting tool, of a feeding dog operatively associated with said blade, means for actuating said feeding dog to intermittently traverse the blade to present the teeth successively to said tool, an element adapted for interlocking engagement with said teeth and movable with the blade in the traverse movement of the latter, means operative after each traverse movement to engage the said element in the tooth last operated upon by the cutting tool, and means operatively connected with said element for regulating the working stroke of said dog in accordance with the pitch of said teeth.

4. In a machine for sharpening toothed cutting blades, the combination with a cutting tool, of a feeding dog operatively associated with said blade, means for actuating said feeding dog to intermittently traverse the blade to present the teeth successively to said tool, and means for automatically regulating the working stroke of said dog to compensate for variations in the distances between said teeth whereby said teeth are accurately positioned relative to the tool, said regulating means comprising an element adapted for engagement with said teeth and movable with the blade in its traverse movement, and means for successively engaging said element with the teeth.

5. In a machine for sharpening toothed cutting blades, the combination with a tool, of mechanism for intermittently traversing the blade to present the teeth successively to said tool, said means including a feeding element, means for advancing and retracting said element into engagement with the blade, means for moving said element in contact with the blade to traverse the latter, and means operatively associated with the said teeth and movable with the latter when the blade is traversed for regulating the working stroke of said feeding element to thereby automatically regulate the traversing movement of said blade in accordance with the pitch measurements of said teeth.

6. In a machine for sharpening toothed cutting blades, the combination with a tool, of means for traversing the said blade to present the teeth successively to said tool, said traversing means including a feeding element positioned for engagement with said blade, mechanism for moving said feeding element in contact with the blade to thereby traverse the latter, resilient means for retracting said feeding element following each working stroke, means for automatically limiting said retractive movement to thereby regulate the working stroke of said element, said means including a member engaging the teeth of said blade adjacent the said tool and movable with the blade when the latter is traversed, and an adjustable stop element actuated by said element to limit the retractive movement of said feeding element.

7. In a machine for sharpening toothed cutting blades, the combination with a cutting tool, of means for adjusting said tool into and out of the gullets between the said teeth, means for intermittently traversing said blade to present the teeth successively to said cutter, said means including a feeding element, a pivoted lever to which said element is adjustably secured, means for oscillating said lever to alternately advance the feeding element in a working stroke, traversing the blade, and retracting the feeding element towards its original position, a cam adjustable to regulate the movement of said lever, an element adapted to engage the teeth of said blade at a point adjacent the cutter, said element being movable with the blade when the latter is traversed, means for actuating said element to engage in successive teeth, and means operatively connecting said element with the adjustable regulating means whereby the movement of said element with the blade regulates the extent of oscillation of said lever and the stroke of said feeding element.

8. In a gin saw filing machine, the combination with a rotary gummer file and means for actuating said file, of mechanism for traversing the saw with respect to said file, said traversing mechanism including a feed dog having a serrated recess adapted for reception of the periphery of said saw, a channel communicating with the bottom of said recess for passage from the latter of filings entering the recess, and means for actuating said dog to intermittently traverse the saw.

9. In a machine of the character set forth, work-traversing mechanism comprising an oscillatory lever, a friction dog carried by said lever, a cam for periodically moving the lever on its pivot to advance the friction dog in its working stroke, a spring for returning the lever towards its original position to retract the dog, a cam element adjustably mounted on said lever and adapted to engage a relatively fixed part of said machine to regulate the return movement of said lever under actuation of said spring, and means for automatically adjusting the cam to thereby regulate the stroke of said feed dog, said means including an element movable with the work when the latter is traversed and operatively connected with said cam.

10. In a gin saw sharpening machine, the combination with a frame having a forward forked extension adapted for reception of the space block of said gin saw, of an arm pivoted on one of said forks and having pivotally attached thereto at opposite sides of said pivot shoes adapted for engagement with the said space block, a lever pivotally secured on the other of said forks, a shoe pivotally attached to said lever and adapted to engage the space block at a point tangent to the shoes first named, and resilient means operatively connected with said lever for resiliently retaining the said third shoe in engagement with the space block.

11. In a gin saw filing machine, the combination with a frame, of means for predeterminedly locating said frame with respect to the saw including a peripherally-recessed gage roller, and openings in the sides of said roller extending from the bottom of said peripheral recess and constituting escape means for filings entering the said recess.

12. In a gin saw filing machine, the combination with a rotary shaft, of a gummer file secured to said shaft, means for intermittently adjusting said shaft to cause the gummer file to enter the gullets between the teeth of said gin saw, means for traversing said gin saw to present successive teeth to said file, journal means for supporting said gummer file shaft for axial movement, a spring normally retaining said shaft and file in an advanced position, said spring permitting an axial adjustment of the file with the saw blade when the latter is traversed, and means operatively associated with said shaft for actuating the said file in engagement with the teeth during the said traverse movement of the blade.

13. In a gin saw sharpening machine, the combination with a support for said machine including elements adapted to engage and clamp the space block of said saw, of means for relatively adjusting said elements to release the space block, mechanism for traversing the saw blade including an indexing pawl adapted for intermittent engagement with the teeth of said saw, and means for operatively connecting said pawl with said clamp element retracting means whereby retraction of the latter adjusts the pawl to a retracted position with respect to the saw.

14. In a gin saw filing machine, the combination with means for supporting said machine on the saw including a space-block clamping element and means for retracting said element to release the machine of a gummer file, mechanism for traversing the saw blade to present the teeth of the saw successively to said gummer file, said feeding means including an indexing pawl adapted for engagement with the teeth of said saw and means operatively associated with the pawl for automatically regulating the working stroke of said traversing mechanism, and means for operatively connecting said pawl with the clamp-retracting means whereby retraction of the clamping element insures a retraction of the pawl from engagement with the saw teeth.

15. A machine of the character described for operating on the gullets of toothed gin saw blades comprising a main frame having spaced extensions, an arm adjustably attached to each of said extensions, one of said arms carrying a pivotally supported yoke, curved shoes pivotally secured to the other of said arms and to said yoke and adapted to engage opposite sides of the space blocks of said gin saw, a second yoke mounted on the frame, gage rollers rotatably supported on said second yoke and adapted to engage the peripheries of said blades at points intermediate the said oppositely disposed shoes, and dressing tools operatively mounted in the frame and operative on said blades, said gage rollers being channeled with opposing convexed surfaces a predetermined depth radially, and said channels terminating in a relatively enlarged channel having openings for escape of foreign matter therefrom.

16. In a machine for dressing toothed blades and in combination with dressing tools, mechanism for intermittently rotating said blades in a circular path to present teeth successively to said tools, said rotating mechanism including a feeding element, means for advancing and retracting said feeding element predeterminedly to and from said blades, means for operating said feeding element while in contact with said blades to rotate the blades intermittently in a circular path, and means including an element engageable successively into the teeth and movable into the blades for automatically controlling said rotating movement relative to the pitch of said teeth.

17. In a machine for dressing toothed blades, work traversing mechanism comprising internally serrated concaved sectors adapted to engage the peripheral edges of said toothed blades, means for actuating said sectors while operatively engaged with said toothed blades to thereby rotate said blades through a predetermined arc, and means for automatically controlling the movement of said sectors in accordance with the pitch measurements of said toothed blades, said automatic means including an element engagable in the gullets of said toothed blades and movable with the latter in the traverse movements, and a cam operatively associated with said element and with the sector-actuating means to regulate the operation of the latter.

18. In a machine of the character described, the combination with a tool adapted to operate on the gullets of toothed blades, of concaved serrated bifurcated segments adapted to act on the peripheral edges of said toothed blades, resilient means for supporting said segments in operative contact with the peripheral edges of said blades, cam means for actuating said segments in a closed path conforming in part with the peripheries of the blades while the said tool is operating on the latter, and synchronized means for actuating said tool and cam.

JOHN R. SMITH.